June 24, 1930.  S. F. PARHAM  1,766,680
GLASS RIBBON FEEDING APPARATUS AND METHOD
Filed July 31, 1928
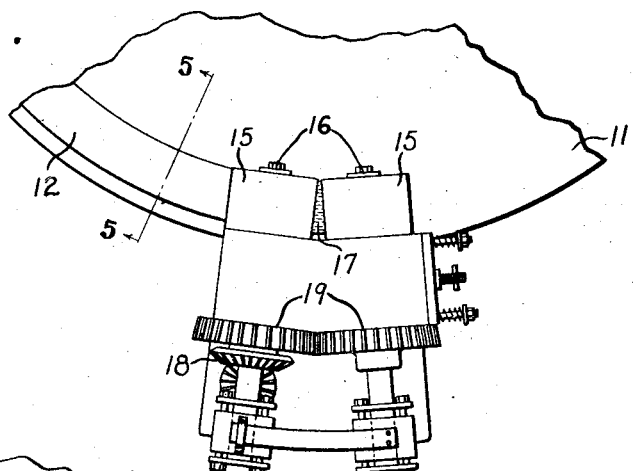
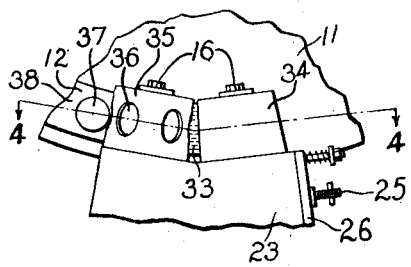
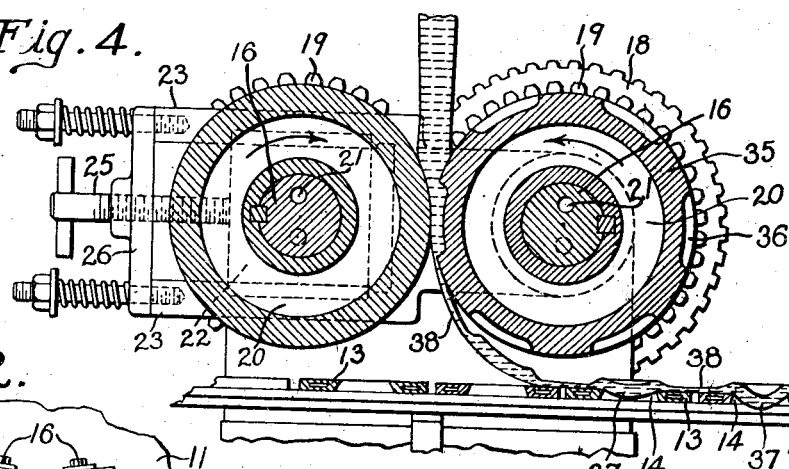
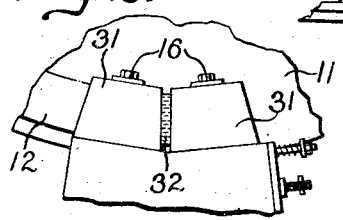
Witness:
Jas. G. White
Inventor
Sidney F. Parham
by Robson D Burn
Attorney Patented June 24, 1930

1,766,680

UNITED STATES PATENT OFFICE

SIDNEY F. PARHAM, OF WEST HARTFORD, CONNECTICUT, ASSIGNOR TO HARTFORD-EMPIRE COMPANY, OF HARTFORD, CONNECTICUT, A CORPORATION OF DELAWARE

GLASS-RIBBON-FEEDING APPARATUS AND METHOD

Application filed July 31, 1928. Serial No. 296,567.

This invention relates to a new method of and apparatus for the manufacture of glassware. One adaptation of the invention is in connection with the manufacture of glass bulbs or similar articles from a continuous ribbon of glass deposited on a rotating table or carrier. Such apparatus is described in the U. S. patent application of Robert W. Canfield, filed March 21, 1927, Serial No. 176,988, to which reference is made for a more complete description of those features of the forming machine which are not fully described herein.

A ribbon of molten glass deposited on a rotating circular table or carrier necessarily has a greater length of path in the outer portion of the ribbon than in the inner portion thereof. When a ribbon of uniform thickness is fed to such a rotating carrier, the tendency is for the outside of the ribbon to stretch and possibly for the inner edge to be compressed, thus resulting in a ribbon with different thicknesses in its outer and inner portions. It is one of the objects of the present invention to provide a ribbon that will have a uniform thickness from one edge to the other after it has been deposited on the carrier. It is also among the objects of the invention to produce a ribbon of uniform thickness, but longer at one edge than at the other edge before it is deposited in an arcuate path so that such ribbon will naturally tend to assume the desired arcuate form before it is constrained to take such form by being deposited on a rotating carrier or otherwise.

In order to more clearly explain the invention, reference is made to the accompanying drawings, which show structural features of the invention and in which Figure 1 is a plan view of a device for feeding a ribbon of molten glass to a rotating carrier;

Fig. 2 is a plan view showing a modified form of rolls;

Fig. 3 is a plan view of a modification incorporating the principles of the modifications of both Fig. 1 and Fig. 2, used in combination and also showing one of the rolls with depressions therein;

Fig. 4 is a vertical section taken on the line 4—4 of Fig. 3, and

Fig. 5 is a vertical section taken on the line 5—5 of Fig. 1.

Referring to the drawings in detail, reference character 11 represents a horizontal rotating carrier or table, on which there is deposited a ribbon of molten glass 12 in a circular or arcuate path. The carrier 11 may be provided with a plurality of orifice plates 13 (Fig. 4), each having an orifice 14 over which rests the ribbon of glass. Suitable blowheads and blow molds (not shown) may be provided for cooperation with the orifices 14 to form portions of the glass ribbon 12 into glassware of the desired form. Apparatus for such forming operations is shown and described in the hereinbefore mentioned application No. 176,988.

As indicated in Fig. 1, the outer portion of the ribbon of glass 12, as it lies on the carrier 11, is longer than the inner portion thereof. If the glass fed past the rolls 15, and prior to its receipt by the carrier, is a ribbon of uniform cross section, the tendency to stretch and elongate the outer portion of the ribbon also tends to reduce the thickness at the outer portion. The means for feeding the glass ribbon is, therefore, so designed that prior to deposit on the carrier, the ribbon is of such form that the resulting deposited ribbon is of uniform thickness. In Fig. 1 is shown a pair of cylindrical rolls 15 carried by shafts 16 rotating around horizontal axes which converge toward the center of the carrier 11. The resulting non-parallel disposition of the adjacent surfaces of the rolls 15 permits a wedge shaped ribbon of glass 17 to pass therebetween. By properly selecting the degree of convergence of the axes of the two shafts 16, the extra thickness of the ribbon at the edge away from the center of the rotating table 11 may be such that the stretching action which results from its conformity to the arcuate path will just reduce the thickness of the outer portion of the ribbon to that of the inner portion, and consequently, a ribbon of uniform thickness will be obtained as shown in section in Fig. 5.

A bevel gear 18 may be secured to one of the shafts 16 and may be driven by some suitable source of power to rotate it at a uniform speed.

The other shaft 16 may be provided with ball bearings or other means of reducing friction and may be driven from the roll carrying the bevel gear 18 through the friction of the rolls and the glass being fed therebetween, or suitable gearing 19, here shown as bevel gears, may connect the two shafts 16 and provide for the positive rotation of both rolls at the same speed.

In the modification shown in Fig. 2, instead of being cylindrical, as in Fig. 1, the rolls 31 are frusto-conical in form and the axes of the shafts 16 are disposed so as to converge toward the center of the table sufficiently to leave an opening for a ribbon 32 of molten glass which is of uniform thickness. Because of the bevel or conical form of the rolls 31, it will be obvious that the ribbon 32 will be drawn between the rolls at a faster rate where the diameter of such rolls is greater and the resultant peripheral velocity is higher. The ribbon of molten glass will therefore be longer at one edge than at the other edge thereof, and will naturally tend to assume an arcuate form even before it is deposited in an arcuate path on the rotating table or carrier.

In the modification shown in Fig. 3, the uniform thickness of the ribbon in its ultimate arcuate path is obtained partly by the wedge shaped space or opening 33 between the rolls and partly by the conical form of the rolls which draw the outer edge of the ribbon faster than the inner portion thereof. In Fig. 3, one of the rolls 39 is shown provided with a plain surface while the other roll 35 is provided with a plurality of depressions 36. Such an arrangement reduces the percentage of waste material as the ribbon has a series of thick portions 37 for use in the molds while the connecting portions 38 of the glass may be much thinner.

The provision of such depressions is for the purpose for which similar depressions are shown in the rolls of the aforesaid Canfield application, Serial No. 176,988, and it is to be understood that if such depressions are used, their bottoms should be suitably inclined to assure that when the ribbon is placed upon the carrier, the enlarged portions are of uniform thickness throughout.

In the rolls of any of the modifications, it may be desirable to provide chambers 20, (Fig. 4), for the circulation of a cooling medium which may be introduced through ducts 21 in the shafts 16. Suitable means (not shown) may be provided to adjust the angle of inclination of the rolls. The degree of separation of the rolls may also be made adjustable by any suitable means as, for instance, by mounting one of the shafts in a bearing block 22 (Fig. 4), which is suitably carried by the guideways 23 and adjustable to position by means of a screw 25 threaded into a spring plate 26. This arrangement not only provides for the adjustment of the space between the rolls, but also provides for a spreading apart of the rolls in the event any unyielding substance, such as a stone or a lump of frozen glass, should be fed between the rolls. To facilitate the adjustment of the space between the rolls, the bevel gears 19 on the shafts 16, if employed, should be made adjustable along their shafts and provided with suitable means, such as set screws, for holding the gears in proper relation in a particular adjustment.

It is to be understood that the above described embodiments of the invention are for the purpose of illustration only and various changes may be made therein without departing from the spirit and scope of the invention as defined in the appended claims.

I claim:

1. In the process of manufacturing glass articles from a ribbon of molten glass, the steps of forming a glass ribbon with a greater amount of material at one edge than at the other edge thereof, and thereafter depositing the ribbon in an arcuate path with the greater amount of material lying in the outer portion of the path whereby the thickness of the ribbon is substantially uniform in its deposited position.

2. In the process of manufacturing glass articles from a ribbon of molten glass, the steps of forming a glass ribbon with a greater amount of material at one edge than at the other edge thereof, the amount of material in the intermediate portions of the ribbon changing gradually from one edge to the other, and thereafter depositing the ribbon in an arcuate path with the greater amount of material lying in the outer portion of the path whereby the thickness of the ribbon is substantially uniform in its deposited position.

3. In the process of manufacturing glass articles from a ribbon of molten glass, the steps of forming a glass ribbon with a greater amount of material at one edge than at the other edge thereof, the amount of material in the intermediate portions of the ribbon changing at a uniform rate from one edge to the other, and thereafter depositing the ribbon in an arcuate path with the greater amount of material lying in the outer portion of the path whereby the thickness of the ribbon is substantially uniform in its deposited position.

4. In the process of manufacturing glass articles from a ribbon of molten glass, the steps of forming a glass ribbon with a greater thickness at one edge than at the other edge thereof, and thereafter depositing the ribbon in an arcuate path with the thicker edge lying in the outer portion of the path, whereby the stretching of the outer portion of the ribbon will tend to reduce the thickness thereof and result in a ribbon of substantially uniform thickness.

5. In the process of manufacturing glass articles from a ribbon of molten glass, the steps of forming a glass ribbon of a greater length at one edge than at the other edge thereof, and thereafter depositing the ribbon in an arcuate path with the longer edge lying in the outer portion of the path.

6. Apparatus for the manufacture of glass, comprising means for forming a ribbon of molten glass with more material in one edge than in the other edge thereof, and means for depositing said ribbon in an arcuate path with the edge of the ribbon having the greater amount of material lying in the outer portion of the path.

7. Apparatus for the manufacture of glass, comprising a rotatable carrier adapted to receive a ribbon of molten glass in an arcuate path, and means for feeding a ribbon of molten glass with more material in one edge than in the other edge thereof to said carrier.

8. Apparatus for the manufacture of glass, comprising a rotatable carrier adapted to receive a ribbon of molten glass and a pair of rolls for feeding a ribbon of molten glass therebetween positioned above said carrier, said rolls being adapted to supply more material to that portion of the ribbon which goes to the outer portion of said carrier.

9. Apparatus for the manufacture of glass, comprising a rotatable carrier adapted to receive a ribbon of molten glass and a pair of rolls positioned above said carrier for feeding the ribbon of molten glass therebetween, said rolls having their adjacent faces non-parallel to provide a thicker edge to that portion of the ribbon which goes to the outer portion of the carrier, whereby when the glass assumes an arcuate form on the carrier, the outer portion of the glass will stretch and the resulting ribbon will be of substantially uniform thickness.

10. Apparatus for feeding a ribbon of molten glass adapted to assume an arcuate path in its own plane, comprising a pair of frusto-conical rolls, means for feeding molten glass therebetween, and means for rotating said rolls whereby the glass is fed faster at the larger ends of the rolls where the peripheral velocity of said rolls is greater.

11. Apparatus for the manufacture of glass, comprising a rotatable carrier adapted to receive a ribbon of molten glass, a pair of frusto-conical rolls positioned above said carrier for feeding a ribbon of molten glass therebetween, and means for rotating said rolls whereby the glass is fed faster at the larger ends of the rolls where the peripheral velocity of said rolls is greater and the resulting ribbon to be deposited on the carrier tends to assume an arcuate form in its own plane, and when received on the carrier is of substantially uniform thickness and lies in an arcuate form on the carrier.

12. Apparatus for the manufacture of glass, comprising a rotatable carrier adapted to receive a ribbon of molten glass, a pair of rolls for feeding a ribbon of molten glass therebetween positioned above said carrier, said rolls being adapted to supply more material to that portion of the ribbon which goes to the outer portion of said carrier, and means for adjusting the space between said rolls.

13. In the process of manufacturing glass articles from a ribbon of molten glass, the steps of forming a glass ribbon which is adapted to assume an arcuate path when lying in its own plane by forming the ribbon at a progressively differential speed from one edge to the other thereof, and thereafter depositing the ribbon in an arcuate path in its own plane.

14. In the process of manufacturing glass articles from a ribbon of molten glass, the steps of forming a glass ribbon which is adapted to assume an arcuate path when lying in its own plane by forming the ribbon at a speed which proportionately varies from one edge of the ribbon to the other, and thereafter depositing the ribbon in an arcuate path in its own plane.

15. In the process of manufacturing glass articles from a ribbon of molten glass, the steps of forming a glass ribbon with a greater amount of material at one edge than at the other and in which the edge having the greater amount of material is the longer, and thereafter depositing the ribbon in an arcuate path with the longer edge having the greater amount of material lying in the outer portion of the path, whereby the thickness of the ribbon is substantially uniform in its deposited position.

16. In the process of manufacturing glass articles from a ribbon of molten glass, the steps of forming a glass ribbon with 'a greater amount of material at one edge than at the other, the edge of the ribbon having the greater amount of material being formed faster than the other edge, and thereafter depositing the ribbon in an arcuate path with the longer edge having the greater amount of material lying in the outer portion of the path, whereby the thickness of the ribbon is substantially uniform in its deposited position.

17. In the process of manufacturing glass articles from a ribbon of molten glass, the steps of forming a glass ribbon with a greater amount of material at one edge than at the other edge thereof, the amount of material in the intermediate portions of the ribbon changing at a uniform rate from one edge to the other and the formation of the ribbon being at a speed increasing proportionately from the thinner edge of the ribbon to the thicker edge thereof, and thereafter depositing the ribbon in an arcuate path with the thicker edge or that with the greater amount of material lying in the outer portion of the path, whereby the thickness of the ribbon is substantially uniform in its deposited position.

18. Apparatus for the manufacture of glass, comprising a rotatable carrier adapted to receive a ribbon of molten glass, and a pair of frusto-conical rolls positioned above said carrier for feeding the ribbon of molten glass therebetween, said rolls having their adjacent faces non-parallel to provide a thicker edge to that portion of the ribbon which goes to the outer portion of the carrier, the frusto-conical shape of the rolls causing the glass to be fed faster at the larger ends of the rolls where the peripheral velocity is greater, whereby when the glass assumes an arcuate form on the carrier, the resulting ribbon will be of substantially uniform thickness.

Signed at Hartford, Connecticut, this 28th day of July, 1928.

SIDNEY F. PARHAM.